(12) United States Patent
Wright et al.

(10) Patent No.: US 11,943,613 B2
(45) Date of Patent: Mar. 26, 2024

(54) SYSTEMS AND METHODS FOR ACCESS POINT DEVICE RECOVERY USING MOBILE DEVICES

(71) Applicant: Charter Communications Operating, LLC, St. Louis, MO (US)

(72) Inventors: Ethan Wright, Longmont, CO (US); Matthew James Wright, Denver, CO (US); Wystan Schmidt, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 17/894,370

(22) Filed: Aug. 24, 2022

(65) Prior Publication Data
US 2022/0408254 A1    Dec. 22, 2022

Related U.S. Application Data

(63) Continuation of application No. 16/788,356, filed on Feb. 12, 2020, now Pat. No. 11,477,643.

(51) Int. Cl.
*H04W 12/08*     (2021.01)
*G06F 8/65*      (2018.01)
*H04L 9/40*      (2022.01)
*H04W 12/06*     (2021.01)
*H04W 76/18*     (2018.01)
(Continued)

(52) U.S. Cl.
CPC ............. *H04W 12/06* (2013.01); *G06F 8/65* (2013.01); *H04L 63/029* (2013.01); *H04W 12/08* (2013.01); *H04W 76/18* (2018.02); *H04W 76/19* (2018.02); *H04W 76/30* (2018.02); *H04W 4/80* (2018.02); *H04W 84/12* (2013.01); *H04W 88/04* (2013.01); *H04W 88/08* (2013.01)

(58) Field of Classification Search
CPC ..... H04W 12/06; H04W 76/18; H04W 76/30; H04W 76/19; H04W 12/08; G06F 8/65; H04L 63/029
See application file for complete search history.

(56) References Cited

U.S. PATENT DOCUMENTS 8,874,741 B2 * 10/2014 Hassan ............... H04L 63/0272
                                                    709/225
10,684,844 B2    6/2020 Compton et al.
(Continued)

*Primary Examiner* — Syed Ali
(74) *Attorney, Agent, or Firm* — Young Basile Hanlon & MacFarlane, P.C.

(57) ABSTRACT

Disclosed herein are methods and systems for access point device recovery and management using mobile devices. The method includes providing, by a mobile device to an access point device via a service provider system, authentication details of the mobile device, establishing a secure wireless connection using the authentication details between the access point device and the mobile device upon receiving, by the mobile device, an indication of failure of a network connection between the service provider system and the access point device, sending, by the mobile device to the access point device over the secure wireless connection, a configuration instruction, receiving, by the mobile device from the access point device over the secure wireless connection, confirmation of the configuration instruction, and disconnecting the secure connection upon successful application of the configuration instruction.

20 Claims, 13 Drawing Sheets

(51) Int. Cl.
*H04W 76/19* (2018.01)
*H04W 76/30* (2018.01)
H04W 4/80 (2018.01)
H04W 84/12 (2009.01)
H04W 88/04 (2009.01)
H04W 88/08 (2009.01)

(56) References Cited

U.S. PATENT DOCUMENTS

| | | | |
|---|---|---|---|
| 11,159,416 B1* | 10/2021 | Colwell | H04L 43/50 |
| 2011/0125898 A1* | 5/2011 | Hassan | H04L 69/40 |
| | | | 709/225 |
| 2015/0173002 A1* | 6/2015 | Nakagawa | H04W 48/16 |
| | | | 455/435.2 |
| 2017/0366454 A1* | 12/2017 | Liu | H04L 61/4511 |
| 2018/0213049 A1* | 7/2018 | Hegde | H04L 67/563 |
| 2018/0359269 A1* | 12/2018 | Caceres | H04L 12/4641 |
| 2019/0158353 A1 | 5/2019 | Johnson et al. | |
| 2019/0260204 A1* | 8/2019 | Koval | H02J 3/14 |
| 2019/0391800 A1 | 12/2019 | Lin et al. | |
| 2020/0028946 A1 | 1/2020 | Vora et al. | |
| 2020/0068014 A1* | 2/2020 | Sarkar | G06F 16/27 |
| 2020/0106784 A1 | 4/2020 | Dawes et al. | |
| 2020/0107165 A1 | 4/2020 | Pai et al. | |
| 2020/0257518 A1 | 8/2020 | Liedtke et al. | |
| 2020/0310706 A1 | 10/2020 | Mitani et al. | |
| 2021/0014308 A1 | 1/2021 | Larsson et al. | |
| 2021/0014565 A1* | 1/2021 | Zamudio | H04N 21/4516 |
| 2021/0076470 A1* | 3/2021 | Graff | H05B 47/19 |
| 2021/0312026 A1 | 10/2021 | Rose | |

\* cited by examiner

SYSTEMS AND METHODS FOR ACCESS POINT DEVICE RECOVERY USING MOBILE DEVICES

CROSS REFERENCE TO RELATED APPLICATION

This application is a continuation of U.S. patent application Ser. No. 16/788,356, filed on Feb. 12, 2020, of which is incorporated herein by reference.

TECHNICAL FIELD

This disclosure relates to network devices and local area network management. More specifically, this disclosure relates to mobile devices providing command and control capabilities between an access point device and a service provider system in the event a network connection between the access point device and the service provider system is down.

BACKGROUND

Local area networks (LANs) are a network of connected devices in a designated area or location such as a residence, office, and the like. In general, a router is used to create the LAN and manage the connected devices. Management of the router can be local via a connected device or remote via a management platform or service located at a service provider system or the like. The management platform can control and command the router to change configurations. In the event the network connection between the service provide system and the router fails due to hardware failure, network attacks, and the like, a service truck or service customer phone call has to be scheduled to correct the failure.

A back-up or redundant connection is needed for providing access between the router and the management platform to reconfigure or perform other activities on the router.

SUMMARY

Disclosed herein are methods and systems for access point device recovery and management using mobile devices. In an implementation, the method includes providing, by a mobile device to an access point device via a service provider system, authentication details of the mobile device, establishing a secure wireless connection using the authentication details between the access point device and the mobile device upon receiving, by the mobile device, an indication of failure of a network connection between the service provider system and the access point device, sending, by the mobile device to the access point device over the secure wireless connection, a configuration instruction, receiving, by the mobile device from the access point device over the secure wireless connection, confirmation of the configuration instruction, and disconnecting the secure connection upon successful application of the configuration instruction.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
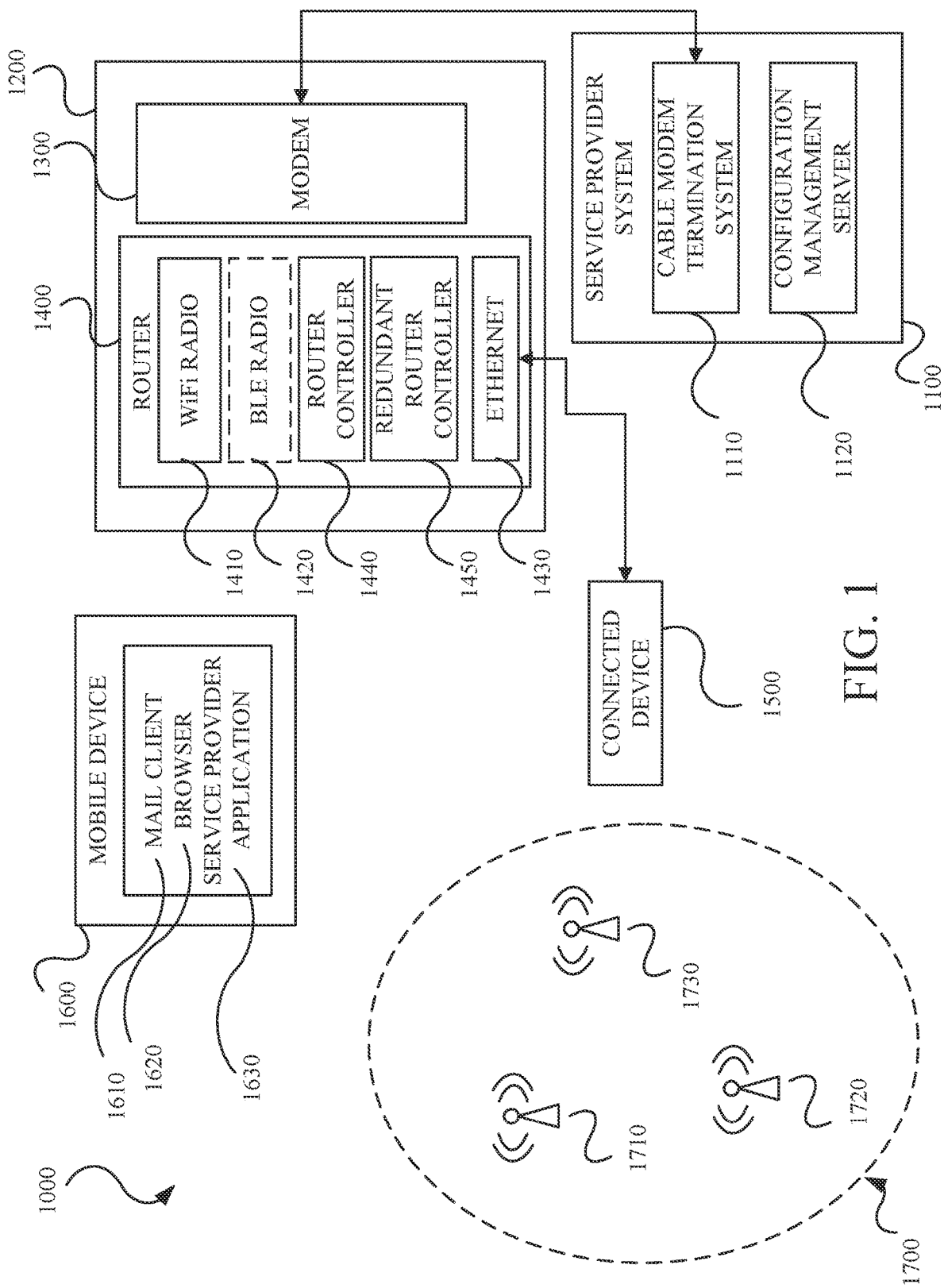
FIG. 1 is a diagram of an example of a network architecture in accordance with embodiments of this disclosure.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer" or "computing device" includes any unit, or combination of units, capable of performing any method, or any portion or portions thereof, disclosed herein. For example, the "computer" or "computing device" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, telephony, web browsers, e-commerce transactions, media players, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions and methods. Those of ordinary skill may thus recognize that other elements and/or steps may be desirable or necessary to implement the devices, systems, compositions and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Disclosed herein are methods and systems for network device and local area network recovery and management using mobile devices. In an implementation, a router is provided with a redundant router controller which connects with a mobile device to relay control, command, and diagnostic data and information to and from a service provider system in the event of a network connection failure between the router and the service provider system. Diagnostic data collected by the router is sent to the service provider system, which in turn can send configuration commands to the router based on the diagnostic data. Router reconfiguration can be quickly and efficiently processed, resulting in reconnection of the network connection between the router and the service provider system.

In an implementation, a service provider application on a mobile device and the redundant router controller provides a means for establishing a secure wireless communication channel between the router and the service provider system in case of an outage. In an implementation, the wireless communication channel can use a Wi-Fi® interface. In an implementation, the wireless communication channel can use a Bluetooth® interface.

In an implementation, authentication certifications would be exchanged between the mobile device, the service provider system, and the router. Upon an outage condition, secure connections are established between the mobile device and the service provider system, and between the mobile device and the router. The router would start sending diagnostic logs to the mobile device, which would act or be seen as a configuration controller. In an implementation, the mobile device sends the diagnostic logs to the service provider system. The service provider system determines a resolution and sends configuration commands to the mobile device, which in turn sends the configuration commands to the router, is seen by the service provider system as a configuration client. In an implementation, the mobile device determines a resolution and sends configuration commands to the router. In an implementation, the mobile device updates the service provider system with the new configuration.

In an implementation, the redundant or back-up communication channel architecture complements existing capabilities. A user would be able to request a service set identifier (SSID) even in the event of network connection outages. The user would send the request to the service provider system as normal. The service provider system would send the new configuration data to the mobile device, which in turn loads the configuration update to the router.

In illustrative examples, even in the event of an outage, configuration instructions can be sent to disable a rogue device, update a policy, update router configuration based on received diagnostic logs, update LAN based rules, update network blocking rules, firewall rules, device kicking rules, firmware updates, software updates, and the like and/or combinations thereof.

FIG. 1 is a diagram of an example of a network architecture 1000 in accordance with embodiments of this disclosure. In implementations, the architecture 1000 can include a service provider system 1100 which provides cable, television, Internet, voice, and like services to premises, residences, offices, and the like (collectively "premises") such as, for example, premises 1200. The service provider system 1100 can include a cable modem termination system 1110 and a configuration management server 1120. The service provider system 1100 is connected to or in communication with (collectively "in communication with") the premises 1200. The premises 1200 can include a modem 1300 which is connected to the cable modem termination system 1110 and to a router 1400. The router 1400 can establish a local area network (LAN) for the premises 1200, where connections to the LAN can be wired, wireless, or combinations thereof. The router 1400 can include radios such as, for example, a Wi-Fi® radio 1410, a BlueTooth® radio 1420, and the like for wireless connectivity and Ethernet ports 1430, for example, for wired connectivity. For example, a connected device 1500 can be connected to the Ethernet port 1430 and a mobile device 1600 can be connected via the Wi-Fi® radio 1410. The router 1400 also includes a router controller 1440 and a redundant router controller 1450 which may also be referred to as a cellular backhaul manager or controller or a back-up communication channel manager or controller. The mobile device 1600 can also be connected to a wireless network 1700, which provides wireless coverage using one or more base stations 1710, 1720, and 1730. The number of base stations is illustrative and the wireless network 1700 may include more or less base stations.

The communications between elements or components in the architecture 1000 may include wired communications, wireless communications, or a combination thereof, as appropriate. In implementations, the architecture 1000 can execute the techniques described in FIGS. 3-13 individually or in combinations thereof. The architecture 1000 and each element or component in the architecture 1000 is illustrative and can include additional, fewer or different devices, entities, element, components, and the like which can be similarly or differently architected without departing from the scope of the specification and claims herein. Moreover, the illustrated devices, entities, element, and components can perform other functions without departing from the scope of the specification and claims herein.

The cable modem termination system 1110 can provide high speed data services, cable Internet, Voice over Internet Protocol, and like services to service provider subscribers located at, for example, at the premises 1200. In implementations, the connection between the cable modem termination system 1110 and the modem 1300 is wired.

The configuration management server 1120 can manage networks, network devices such as routers, switches, and the like. The configuration management server 1120 can analyze diagnostic data from network devices, determine a resolution, and send commands to the network devices to correct or repair the network device configuration. The configuration management server 1120 can determine the status of the connection with the network device. In the event of a network connection failure or outage, the configuration management server 1120 can send commands to the network device via a securely and authenticated mobile device connection.

The modem 1300 converts data for transmission between computing devices over a transmission medium such as a fiber optical cable, coaxial cable, and the like. The modem 1300 encodes and decodes digital information for transmission and reception between the computing devices. The modem 1300 is connected to the router 1400.

The router 1400 can determine the most inexpensive, fastest, least-busy, best quality, or other criteria-based routes for delivering or forwarding packets between source and destination devices. Configuration of the router 1400 is nominally done by the configuration management server 1120. The router controller 1440 controls connection configurations and other router control functionality based on commands received from the configuration management server 1120 via a wired connection such as between the modem 1300 and the cable modem termination system 1110. The redundant router controller 1440 controls connection configurations and other router control functionality based on commands received from the configuration management server 1120 via a back-up or redundant communication channel which is formed from two connections including a first connection between the mobile device 1600 and the router 1400, and a second connection between the mobile device 1300 and the service provider system 1100 and/or configuration management server 1120. The router 1400 is an illustrative access point device and other network devices can be used. In implementations, the modem 1300 and the router 1400 can be an integrated access point device such as a gateway.

The connected device 1500 can be, but is not limited to, end user devices, set-top boxes, personal computers (PCs), cellular telephones, Internet Protocol (IP) devices, computers, desktop computers, laptops, mobile devices, handheld computers, PDAs, personal media devices, smartphones, notebooks, notepads, phablets and the like which can be connected to the Ethernet port 1430.

The mobile device 1600 can be, but is not limited to, end user devices, cellular telephones, Internet Protocol (IP) devices, laptops, mobile devices, handheld computers, PDAs, personal media devices, smartphones, notebooks, notepads, phablets and the like. For example, in an implementation, the mobile device 1600 can include applications such as, but not limited to, a mail application 1610, a web browser application 1620, a service provider application 1630 and the like. The service provider application 1630 enables the mobile device 1600 to perform as a relay between the service provide system 1100 and the router 1400 in the event of an outage. The mobile device 1600 and/or the service provider application 1630 can store and use a public and private key to establish secure and authenticated connections with the router 1400. In implementations, the mobile device 1600 and/or the service provider application 1630 can establish secure MQ Telemetry Transport (MQTT) or like messaging protocol connections with the service provider system 1100 or exchange secure messages using the MQTT or like messaging protocol connections.

The wireless network 1700 and the one or more base stations 1710, 1720, and 1730 can be any cellular, mobile, or like standard for wireless communications including, for example, but not limited to, 3G, 4G, 5G, Global System for Mobile Communications (GSM), Long-Term Evolution (LTE), Code-division multiple access (CDMA), and the like.

Figure 2:
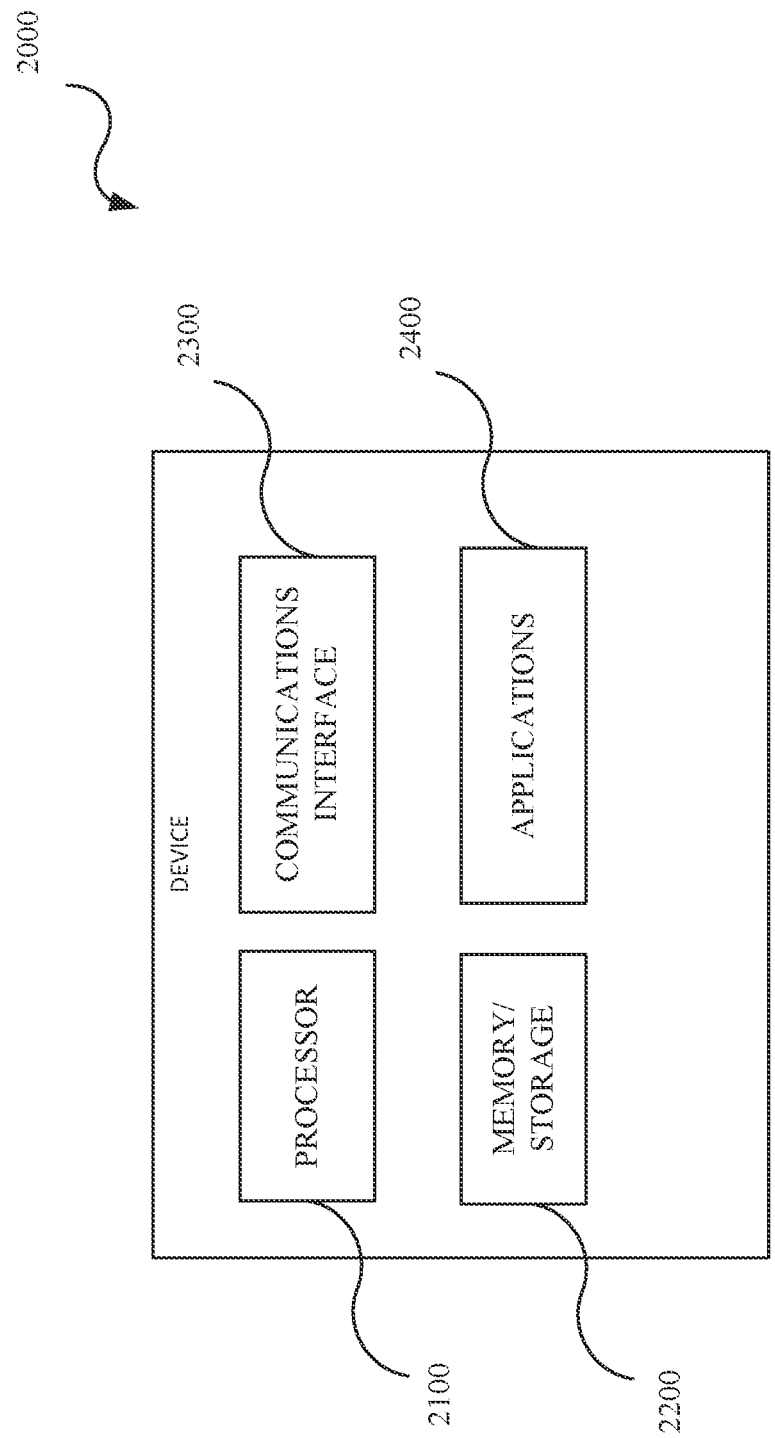
FIG. 2 is a block diagram of an example of a device in accordance with embodiments of this disclosure.

FIG. 2 is a block diagram of an example of a device 2000 in accordance with embodiments of this disclosure. The device 2000 may include, but is not limited to, a processor 2100, a communication interface 2200, a memory/storage 2300, and applications 2400. The device 2000 may include or implement, for example, the service provider system 1100, the cable modem termination system 1110, the configuration management system 1120, the modem 1300, the router 1400, the router controller 1440, the redundant router controller 1450, the connected device 1500, the mobile device 1600, the wireless network 1700, and the base stations 1710, 1720, and 1730. The applicable or appropriate techniques or methods as described with respect to FIGS. 3-13 may be stored in the memory/storage 2300 and executed by the processor 2100 in cooperation with the memory/storage 2300, the communications interface 2200, and the applications 2400, as appropriate. The applicable or appropriate techniques or methods as described with respect to FIGS. 3-13 can be executed individually or in various combinations thereof. The device 2000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

Operationally with respect to FIGS. 1-2, and as described in detail herein below, a LAN can be established using the router 1400, which is connected to the service provider system 1100 via the modem 1300 and the cable modem termination system 1110. The router 1400 and/or router controller 1440 can send diagnostic information to the service provider system 1100 and/or configuration management server 1120 and the service provider system 1100 and/or configuration management server 1120 can send control and configuration commands to the router 1400 via the modem 1300 and the cable modem termination system 1110 connection. The connected device 1500 and the mobile device 1600 can connect to and use the LAN as appropriate. In implementations, the mobile device 1600 can exchange authentication information or credentials with the router 1400 via the service provider system 1100. These authentication information or credentials can then be used in the event of an outage between the service provider system 1100 and the router 1400.

In the event of a network connection failure, the router 1400 and/or the redundant router controller 1450 can advertise the need for the back-up communication channel. The network connection failure can be due a variety of reasons, some of which are illustrated herein. In a non-limited example, the failure can be between the modem 1300 and the cable modem termination system 1110 connection. The mobile device 1600 can authenticate with the router 1400 and/or the redundant router controller 1450 to establish a secure and authenticated wireless connection. The secure and authenticated wireless connection can be, for example, a WiFi®, BlueTooth®, or other wireless communication based connection. The redundant router controller 1450 can take control of the router 1400 from the router controller 1440. The mobile device 1600 can then relay diagnostic data received from the router 1400 and/or the redundant router controller 1450 to the service provider system 1100 and/or configuration management server 1120. The configuration management server 1120 can then send configuration commands to the router 1400 and/or the redundant router controller 1450 via the mobile device 1600. The redundant router controller 1450 can then reconfigure the router 1400 in accordance with the received configuration commands. If the network connection is re-established, then the mobile device 1600 connection can be disconnected and the router controller 1440 can take control of the router 1400 from the redundant router controller 1450.

Figure 3:
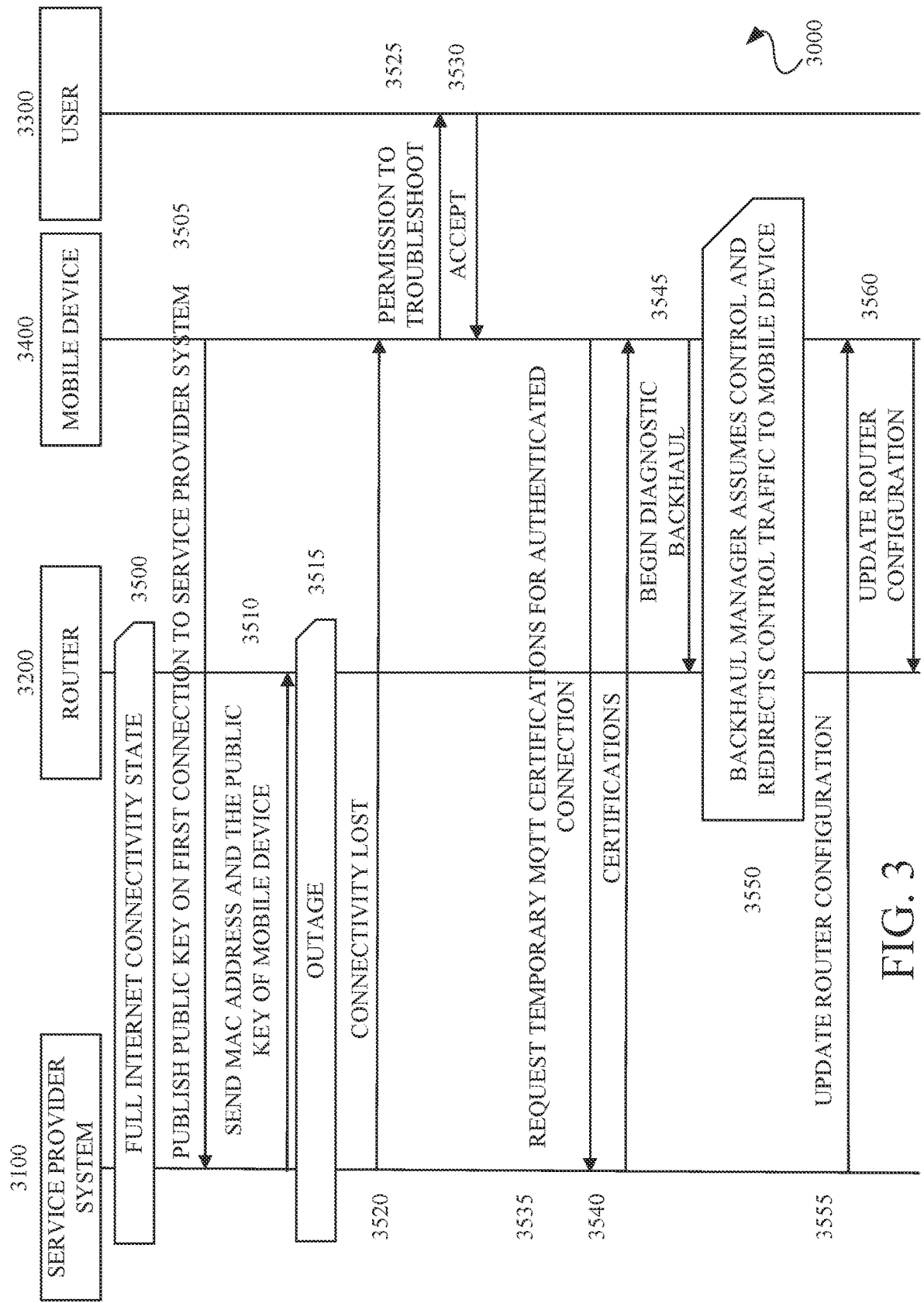
FIG. 3 is a flow diagram of an example of a method for network device and local area network recovery and management using mobile devices in accordance with embodiments of this disclosure.

FIG. 3 is a flow diagram 3000 of an example of a method for network device and local area network recovery and management using mobile devices in accordance with embodiments of this disclosure. The flow diagram 3000 describes communications and events with respect to a service provider system 3100, a router 3200, and a mobile device 3400 associated with a user 3300 or subscriber to the services provided by the service provider system 3100. Initially there is a full or complete network connection between the service provider system 3100 and the router 3200 (3500). In implementations, the network connection is an Internet connection. Upon initial connection to the router 3200 or associated LAN, the mobile device 3400 can publish authentication credentials to the service provider system 3100 (3505). In implementations, the mobile device 3400 can have public and private keys and the public key can be published to the service provider system 3100. The service provider system 3100 can then send a media access control (MAC) address to and load the public key on the router 3200 (3510).

An outage occurs (3515). The service provider system 3100 can send a message to the mobile device 3400 that a back-up communication channel or backhaul connection is needed to communicate with the router 3200 (3520). The mobile device 3400 can then send a request or notification to the user 3300 for approval (3525). The user 3300 can then send or provide approval (3530), upon which the mobile device 3400 can then send a request for certifications for an authenticated connection to the service provider system 3100 (3555). The service provider system 3100 can send the certifications (3540) and the mobile device 3400 can request diagnostic logs on the back-up communication channel or backhaul connection (3545). The back-up communication channel or backhaul connection can be a Wi-Fi® connection, a Bluetooth® connection, or any wireless connection. At this point, a backhaul manager or controller (e.g., the redundant router controller 1450 of FIG. 1) can assume control of the router 3200 and can redirect the control traffic including the diagnostic data to the mobile device 3400 (3550) which in turn can relay the control traffic including the diagnostic data to the service provider system 3100. The service provider system 3100 can then send router configuration data, commands, or instructions to the mobile device 3400 (3555), which in turn can update the router 3200 with the router configuration data, commands, or instructions (3560).

Figure 4:
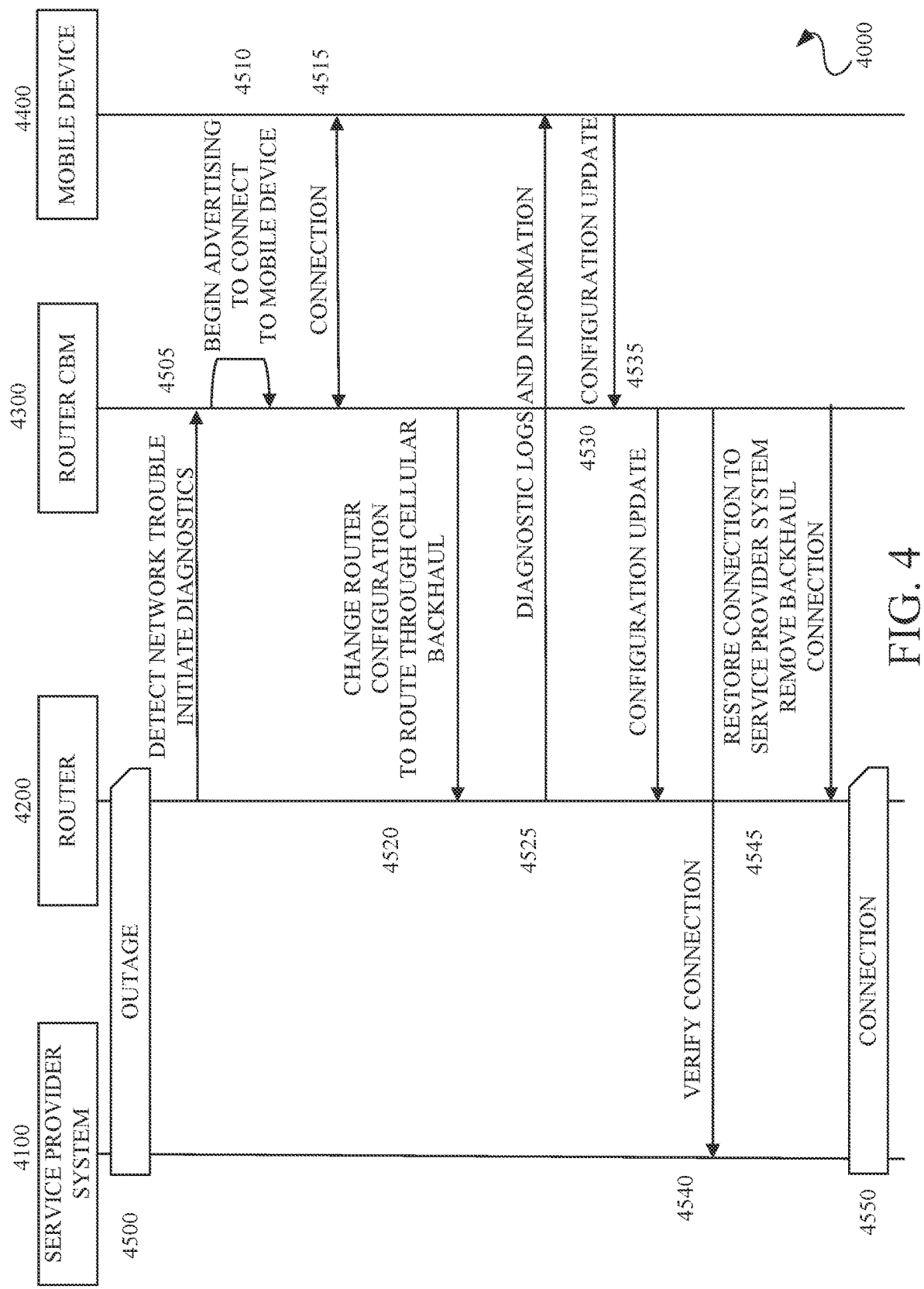
FIG. 4 is a flow diagram of an example of a method for network device and local area network recovery and management using mobile devices in accordance with embodiments of this disclosure.

FIG. 4 is a flow diagram 4000 of an example of a method for network device and local area network recovery and management using mobile devices in accordance with embodiments of this disclosure. The flow diagram 4000 describes communications and events with respect to a service provider system 4100, a router 4200 which includes a router cellular backhaul manager (CBM) 4300, and a mobile device 4400. In the event of an outage (4500), the router 4200 can detect network connection failure and initiate diagnostics (4505). The router CBM 4300 can assume control of the router 4200 and begin advertising to the mobile device 4400 that a cellular backhaul connection is needed (4510). The mobile device 4400 and the router CBM 4300 can then establish an authenticated or secure cellular backhaul connection (4515). The cellular backhaul connection can be a Wi-Fi® connection, a Bluetooth® connection, or any wireless connection. The router CBM 4300 can then change the router configuration to route control traffic through the cellular backhaul connection (4520).

The router 4200 can then send diagnostic logs and information to the mobile device 4400 (4525). The mobile device 4400 can then send router configuration data, commands, or instructions to the router CBM 4300 (4530), which in turn can update the router 4200 with the router configuration data, commands, or instructions (4535). The router CBM 4300 can then verify reestablishment of the network connection with the service provider 4100 (4300), restore the network connection between the router 4200 and the service provider 4100, and remove the cellular backhaul connection (4545). The router 4200 and the service provider 4100 can now communicate over the restored network connection (4550).

Figure 5:
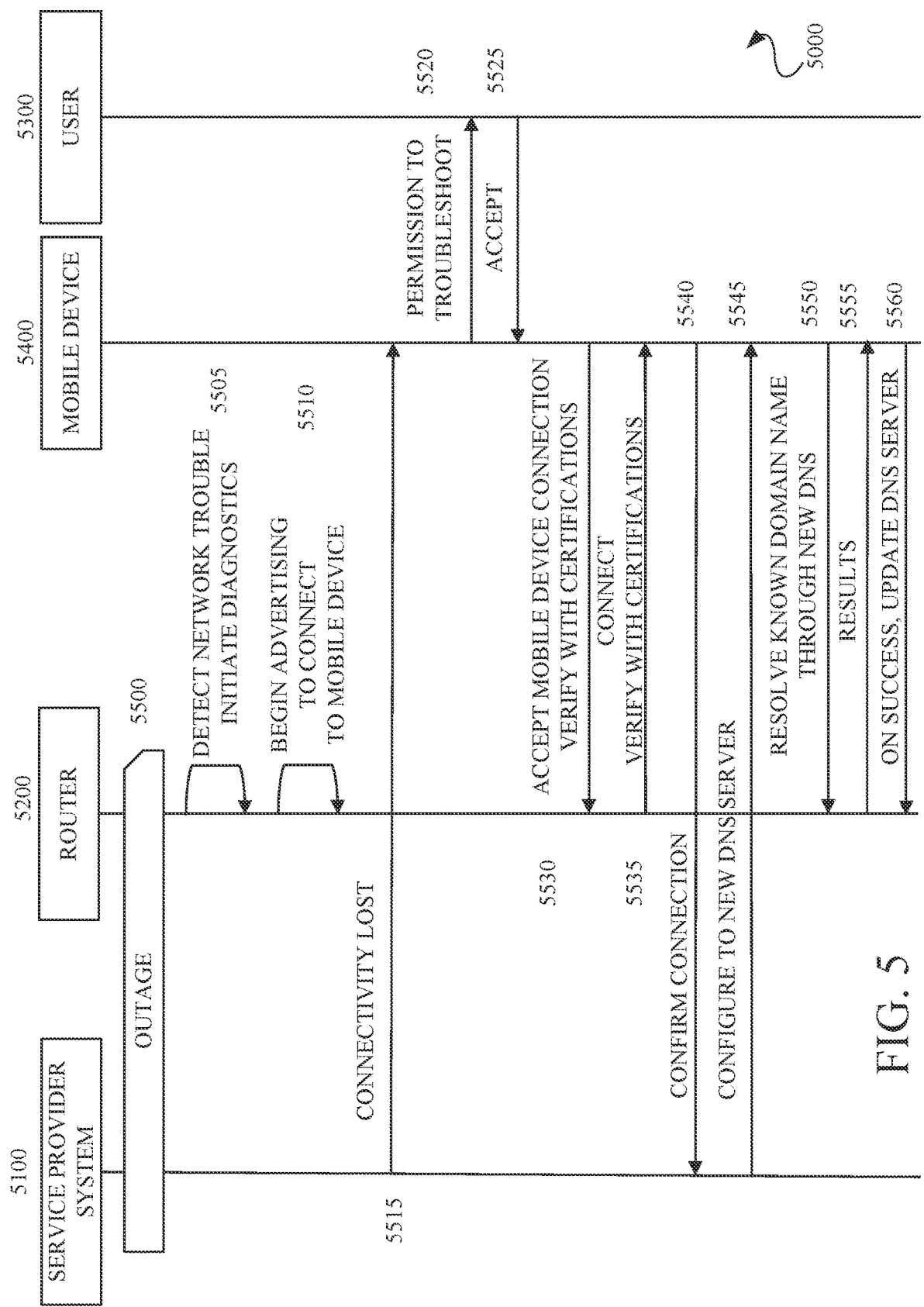
FIG. 5 is a flow diagram of an example of a method for network device and local area network recovery and management using mobile devices in accordance with embodiments of this disclosure.

FIG. 5 is a flow diagram 5000 of an example of a method for network device and local area network recovery and management using mobile devices in accordance with embodiments of this disclosure. The flow diagram 5000 describes communications and events with respect to a service provider system 5100, a router 5200, and a mobile device 5400 associated with a user 5300 or subscriber to the services provided by the service provider system 5100. In the event of an outage (5500), the router 5200 can detect network connection failure and initiate diagnostics (5505) and begin advertising to the mobile device 5400 that a backhaul connection is needed (5510). The backhaul connection can be a Wi-Fi® connection, a Bluetooth® connection, or any wireless connection. In addition, the service provider system 5100 can send a message or notification of a network connection failure to the mobile device 5400 (5515). The mobile device 5400 can then send a request or notification to the user 5300 for approval (5520). The user 5300 can then send or provide approval (5525), upon which the mobile device 5400 can then send a request to the router 5200 to accept the backhaul connection and verify the certifications (5530). The router 5200 can verify the certifications and establish the backhaul connection (5535). The mobile device 5400 can confirm connection with the service provider system 5100 (5540).

In an illustrative example, the outage may have been due to a bad or corrupted domain name system (DNS) server configuration. In this outage event, the service provider system 5100 can send to the mobile device 5400 configuration instructions to connect to a different DNS server (5545). The mobile device 5400 can send the configuration instructions to the router 5200, which in turn can attempt to resolve the different DNS server (5550). The router 5200 can send the results from resolving the different DNS server to the mobile device 5400 (5555), which in turn can instruct the router 5200 to update to the different DNS server (5560).

Figure 6:
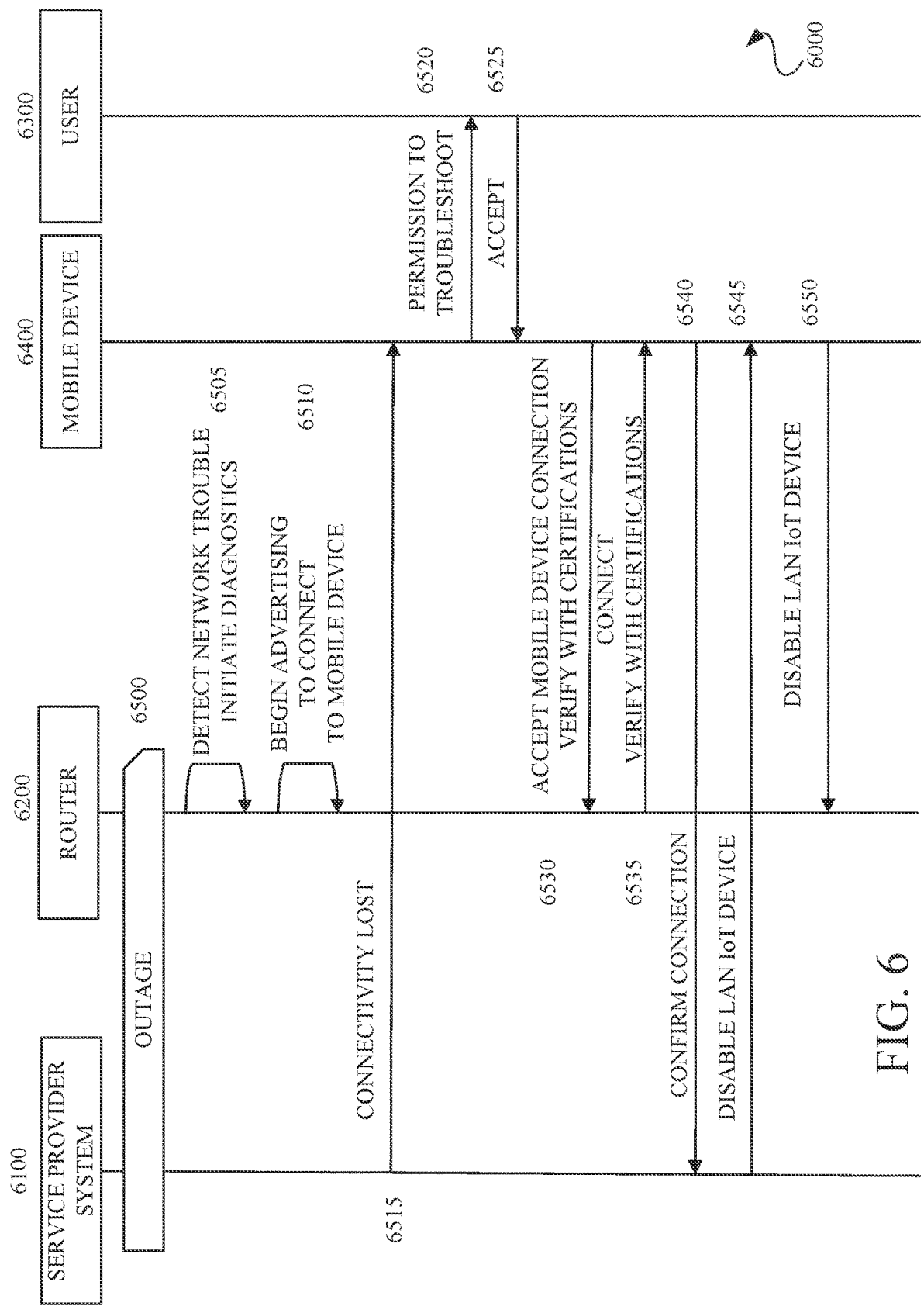
FIG. 6 is a flow diagram of an example of a method for network device and local area network recovery and management using mobile devices in accordance with embodiments of this disclosure.

FIG. 6 is a flow diagram 6000 of an example of a method for network device and local area network recovery and management using mobile devices in accordance with embodiments of this disclosure. The flow diagram 6000 describes communications and events with respect to a service provider system 6100, a router 6200, and a mobile device 6400 associated with a user 6300 or subscriber to the services provided by the service provider system 5100. In the event of an outage (6500), the router 6200 can detect network connection failure and initiate diagnostics (6505) and begin advertising to the mobile device 6400 that a backhaul connection is needed (6510). In addition, the service provider system 6100 can send a message or notification of a network connection failure to the mobile device 6400 (6515). The mobile device 6400 can then send a request or notification to the user 6300 for approval (6520). The user 6300 can then send or provide approval (6525), upon which the mobile device 6400 can then send a request to the router 6200 to accept the backhaul connection and verify the certifications (6530). The router 6200 can verify the certifications and establish the backhaul connection (6535). The backhaul connection can be a Wi-Fi® connection, a Bluetooth® connection, or any wireless connection. The mobile device 6400 can confirm the connection with the service provider system 6100 (6540).

In an illustrative example, the outage may have been due to a rogue Internet of Things (IoT) device. In this outage event, the service provider system 5100 can send instructions to the mobile device 6400 to disable the IoT device from the LAN or the router 6200 (6545). The mobile device 6400 can send the instructions to the router 6200, which in turn can disable or disconnect the rogue IoT device.

Figure 7:
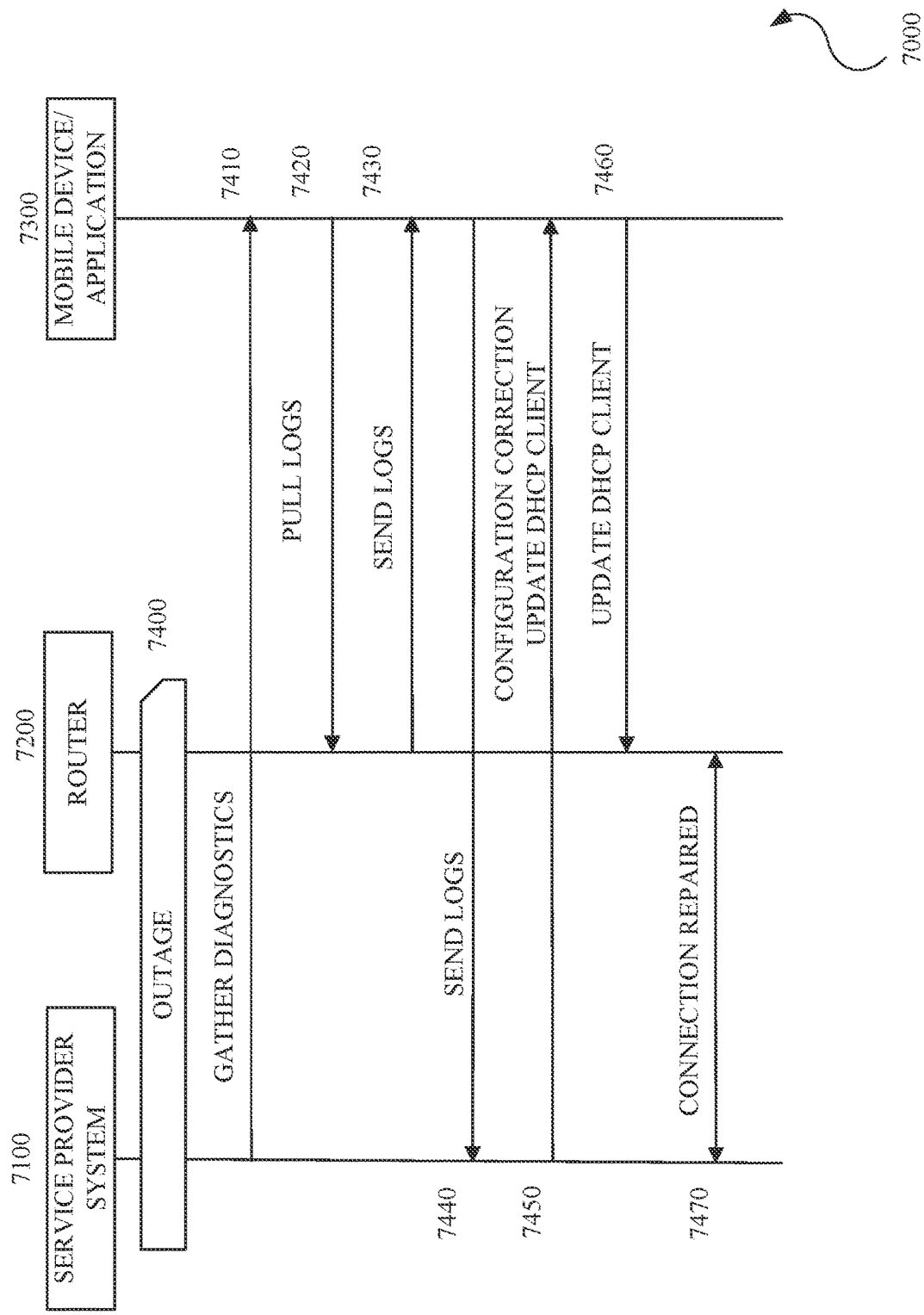
FIG. 7 is a flow diagram of an example of a method for network device and local area network recovery and management using mobile devices in accordance with embodiments of this disclosure.

FIG. 7 is a flow diagram 7000 of an example of a method for network device and local area network recovery and management using mobile devices in accordance with embodiments of this disclosure. The flow diagram 7000 describes communications and events with respect to a service provider system 7100, a router 7200, and a mobile device 7300 including a service provider application. In the event of an outage (7400), the service provider system 7100 can send instructions to the mobile device 7300 to gather diagnostics from the router 7200 (7410), which in turn can send instructions, over a secure wireless connection, to the router 7200 to pull the diagnostic logs (7420). The secure wireless connection can be a Wi-Fi® connection, a Bluetooth® connection, or any wireless connection. The router 7200 sends the pulled diagnostic logs to the mobile device 7300 (7430), which in relays or forwards the diagnostic logs to the service provider system 7100 (7440). The service provider system 7100 can send configuration correction updates to the mobile device 7300. The configuration correction updates can include Dynamic Host Configuration Protocol (DHCP) client updates for the router 7200. The mobile device 7300 can send the DHCP client updates to the router 7200 (7450), which in turn can perform the update (7460). The network connection is restored upon successful repair (7470).

Figure 8:
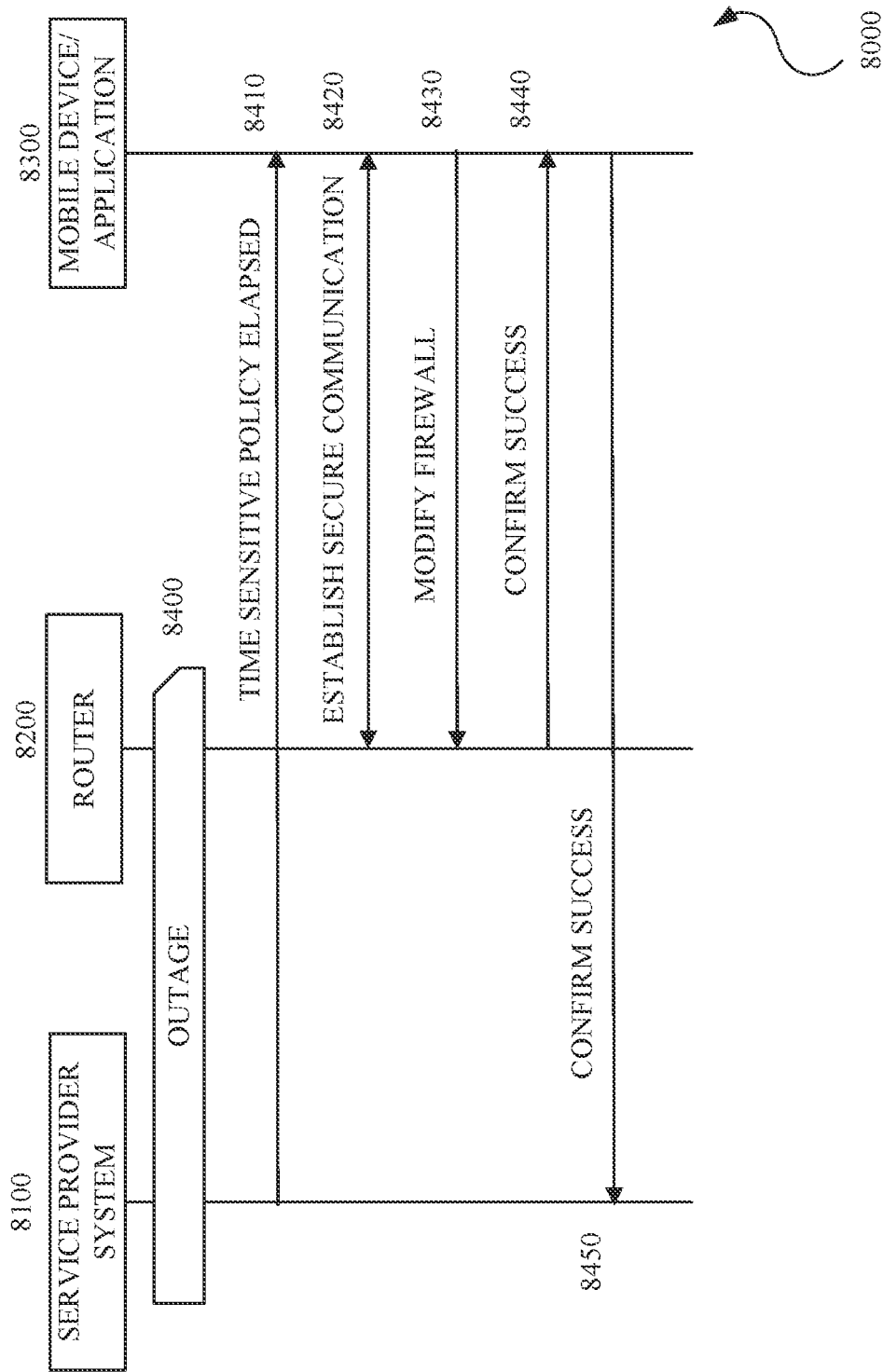
FIG. 8 is a flow diagram of an example of a method for network device and local area network recovery and management using mobile devices in accordance with embodiments of this disclosure.

FIG. 8 is a flow diagram 8000 of an example of a method for network device and local area network recovery and management using mobile devices in accordance with embodiments of this disclosure. The flow diagram 8000 describes communications and events with respect to a service provider system 8100, a router 8200, and a mobile device 8300 including a service provider application. In the event of an outage (8400), the service provider system 8100 can send an alert notification and instructions to the mobile device 8300 (8410). In an illustrative example, the alert notification can be due to elapsing or timing out of a time sensitive policy and the instructions can be configuration details to address the alert notification. The mobile device 8300 can establish a secure wireless connection with the router 8200 (8420). The secure wireless connection can be a Wi-Fi® connection, a Bluetooth® connection, or any wireless connection. The mobile device 8300 can send the alert notification and instructions to the router 8200 (8430). In an illustrative example, the instructions can be to modify a firewall. The router 8200 can send operational confirmation of the instructions (8440). In an illustrative example, the operational confirmation can be success, failure, and the like. The mobile device 8300 can send the operational confirmation to the service provider system 8100 (8450).

Figure 9:
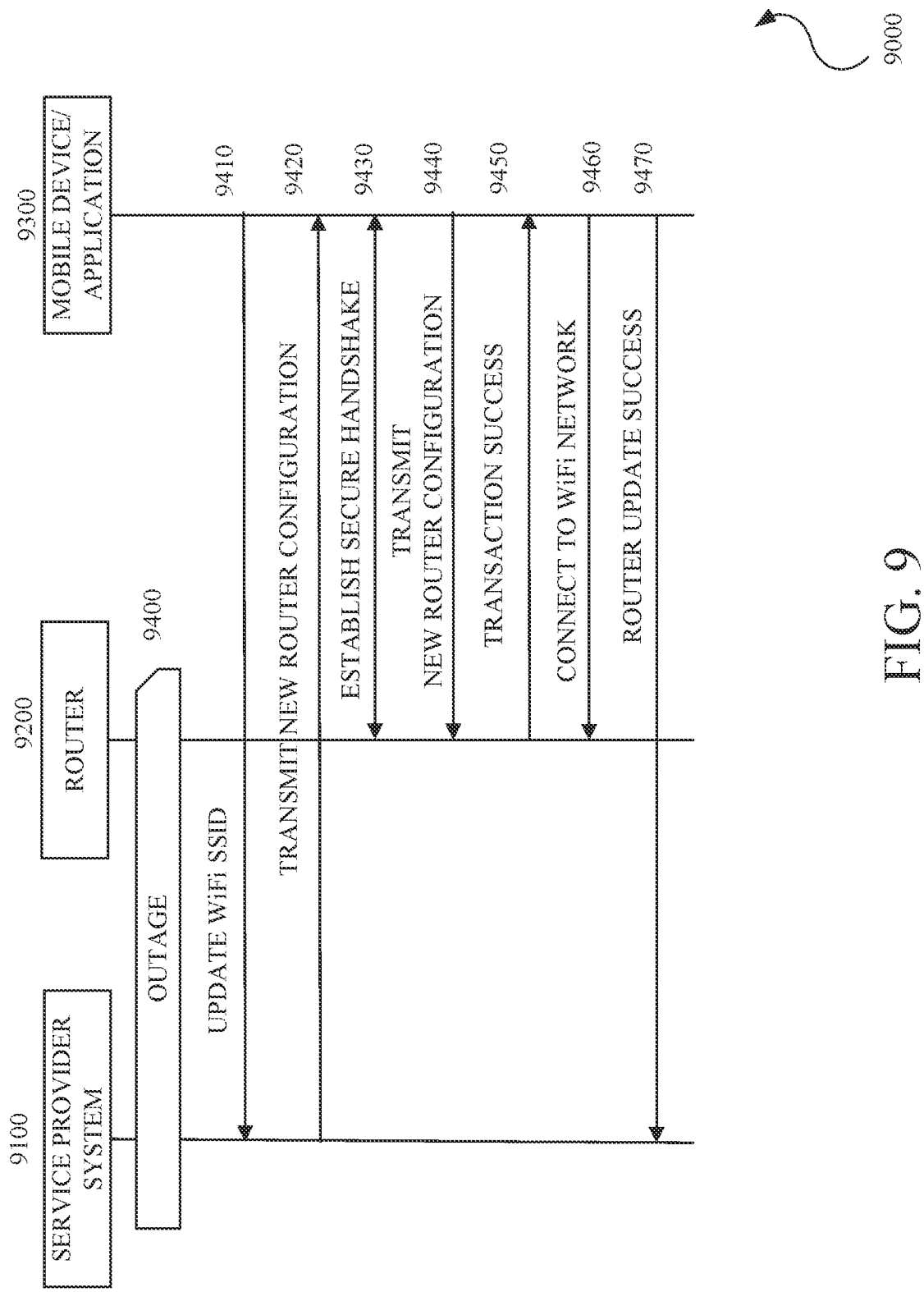
FIG. 9 is a flow diagram of an example of a method for network device and local area network recovery and management using mobile devices in accordance with embodiments of this disclosure.

FIG. 9 is a flow diagram 9000 of an example of a method for network device and local area network recovery and management using mobile devices in accordance with embodiments of this disclosure. The flow diagram 9000 describes communications and events with respect to a service provider system 9100, a router 9200, and a mobile device 9300 including a service provider application. During an outage (9400), the mobile device 9300 can send a request for a configuration change or update to the service provider system 9100 (9410). In an illustrative example, the configuration change or update request can be to change the Wi-Fi® SSID. The service provider system 9100 can send the configuration update for the router 9200 to the mobile device 9300 in view of the outage (9420). The mobile device 9300 can perform a secure handshake with the router 9200 to establish a secure connection (9430). The secure connection can be a Wi-Fi® connection, a Bluetooth® connection, or any wireless connection. The mobile device 9300 can send the configuration update to the router 9200 over the secure connection (9440). Upon completing the configuration update, the router 9200 can send a transaction success message to the mobile device 9300 (9450)

Figure 10:
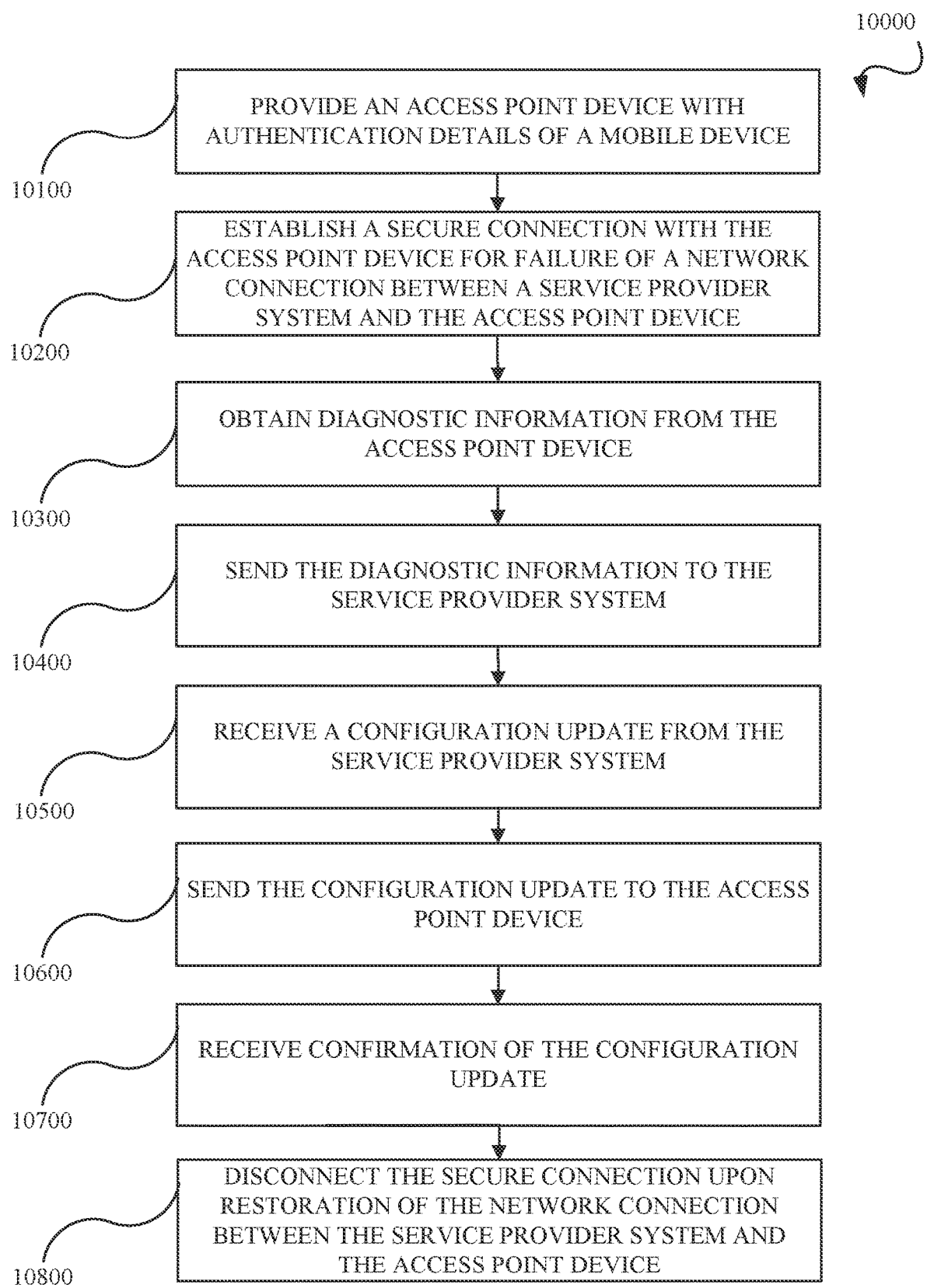
FIG. 10 is a flowchart of an example method for network device and local area network recovery and management using mobile devices in accordance with embodiments of this disclosure.

FIG. 10 is a flowchart of an example method 10000 for network device and local area network recovery and management using mobile devices in accordance with embodiments of this disclosure. The method 10000 includes: providing 10100 an access point device with authentication details of a mobile device; establishing 10200 a secure connection with the access point device for failure of a network connection between a service provider system and the access point device; obtaining 10300 diagnostic information from the access point device; sending 10400 the diagnostic information to the service provider system; receiving 10500 a configuration update from the service provider system; sending 10600 the configuration update to the access point device; receiving 10700 confirmation of the configuration update; and disconnecting 10800 the secure connection upon restoration of the network connection between the service provider system and the access point device. For example, the technique 10000 may be implemented, as applicable and appropriate, by the service provider system 1100, the cable modem termination system 1110, the configuration management system 1120, the modem 1300, the router 1400, the router controller 1440, the redundant router controller 1450, the connected device 1500, the mobile device 1600, the wireless network 1700, the base stations 1710, 1720, and 1730, the device 2000, the processor 2100, the communication interface 2200, the memory/storage 2300, and the applications 2400.

The method 10000 includes providing 10100 an access point device with authentication details of a mobile device. In implementations, a service provider can provide services to a premises by providing and connecting an access point device to a service provider system via a network connection. Configuration and maintenance of the access point device can be performed over the network connection. A secondary connection for configuration and maintenance can be provided by enabling the access point device and a mobile device associated with the premises be connected in case the network connection fails. The mobile device can provide authentication credentials, such as public and private keys, to the access point device when the mobile device initially connects to the access point device. In implementations, this can be processed via the service provider system. The access point device can have one or more controllers to handle the network connection and the secondary connection.

The method 10000 includes establishing 10200 a secure connection with the access point device for failure of a network connection between a service provider system and the access point device. The mobile device and the access point device can perform an authentication or secure handshake to establish a secure connection upon receipt of notification of a failure. In implementations, notification can be provided by the service provider system, the access point device, and/or combinations thereof. In implementations, the access point device can advertise the need for the secondary connection to the mobile device. In implementations, receipt of the notification can generate an alert to a user of the mobile device for permission to use the mobile device in the secondary connection. In this instance, the authentication or secure handshake process can take place upon user approval.

The method 10000 includes obtaining 10300 diagnostic information from the access point device. In implementations, the access point device can initiate gathering of diagnostic data in the event of a network connection failure. In implementations, the mobile device can instruct the access point device to gather the diagnostic data.

The method 10000 includes sending 10400 the diagnostic information to the service provider system. The diagnostic data provided by the access point device is sent by the mobile device to the service provider system.

The method 10000 includes receiving 10500 a configuration update from the service provider system. The service provider system can review the diagnostic data received from the mobile device and generate a configuration update in view of the diagnostic data.

The method 10000 includes sending 10600 the configuration update to the access point device. The mobile device can relay or forward the configuration update to the access point device.

The method 10000 includes receiving 10700 confirmation of the configuration update. The access point device can apply the configuration update and send results to the mobile device. In implementations, the mobile device can confirm application of the configuration update.

The method 10000 includes disconnecting 10800 the secure connection upon restoration of the network connection between the service provider system and the access point device. The secondary connection can be disconnected upon successful application of the configuration update and restoration of the network connection.

Figure 11:
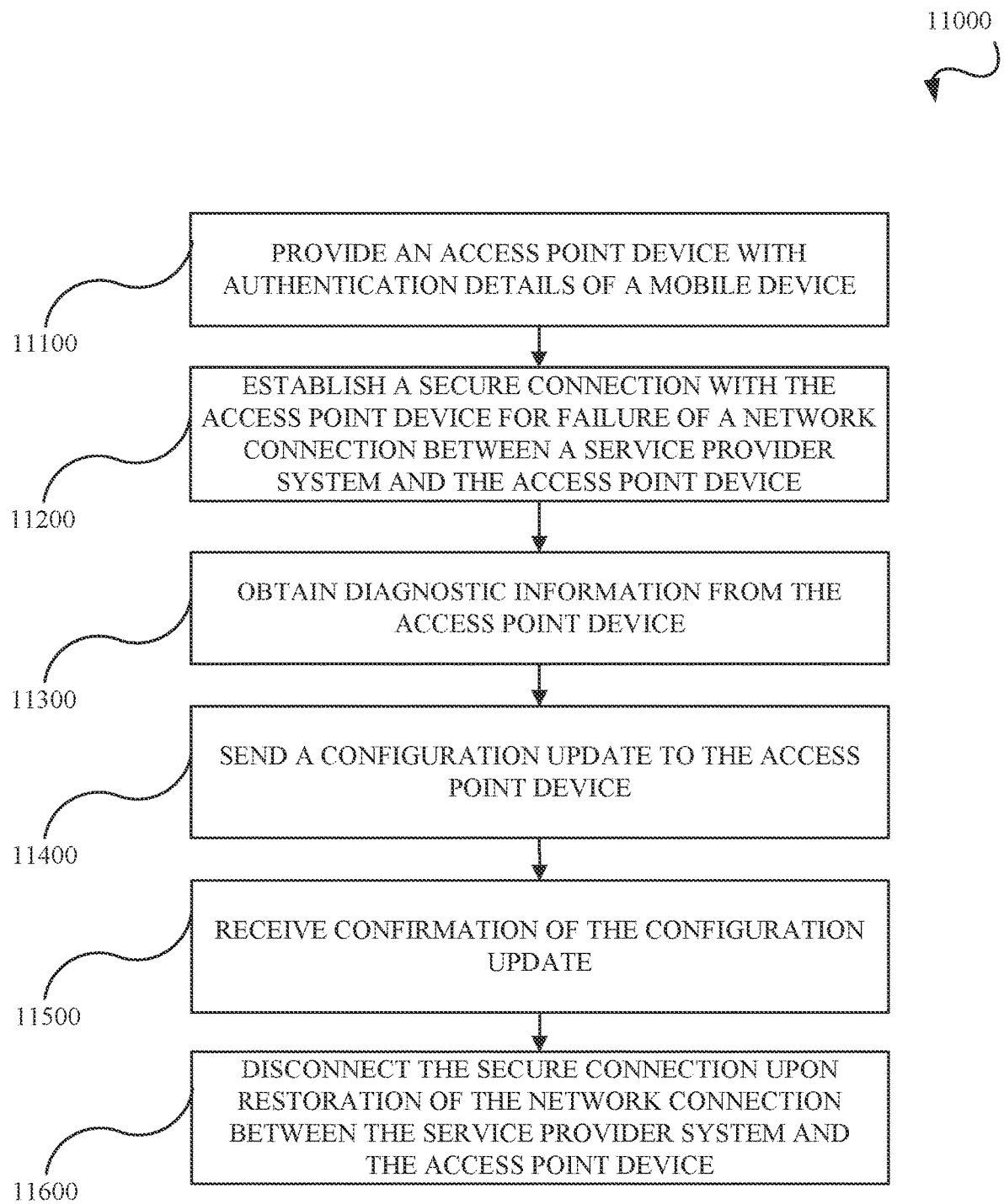
FIG. 11 is a flowchart of an example method for network device and local area network recovery and management using mobile devices in accordance with embodiments of this disclosure.

FIG. 11 is a flowchart of an example method 11000 for network device and local area network recovery and management using mobile devices in accordance with embodiments of this disclosure. The method 11000 includes: providing 11100 an access point device with authentication details of a mobile device; establishing 11200 a secure connection with the access point device for failure of a network connection between a service provider system and the access point device; obtaining 11300 diagnostic information from the access point device; sending 11400 a configuration update to the access point device; receiving 11500 confirmation of the configuration update; and disconnecting 11600 the secure connection upon restoration of the network connection between the service provider system and the access point device. For example, the technique 11000 may be implemented, as applicable and appropriate, by the service provider system 1100, the cable modem termination system 1110, the configuration management system 1120, the modem 1300, the router 1400, the router controller 1440, the redundant router controller 1450, the connected device 1500, the mobile device 1600, the wireless network 1700, the base stations 1710, 1720, and 1730, the device 2000, the processor 2100, the communication interface 2200, the memory/storage 2300, and the applications 2400.

The method 11000 includes providing 11100 an access point device with authentication details of a mobile device. In implementations, a service provider can provide services to a premises by providing and connecting an access point device to a service provider system via a network connection. Configuration and maintenance of the access point device can be performed over the network connection. A secondary connection for configuration and maintenance can be provided by enabling the access point device and a mobile device associated with the premises be connected in case the network connection fails. The mobile device can provide authentication credentials, such as public and private keys, to the access point device when the mobile device initially connects to the access point device. In implementations, this can be processed via the service provider system. The access point device can have one or more controllers to handle the network connection and the secondary connection.

The method 11000 includes establishing 11200 a secure connection with the access point device for failure of a network connection between a service provider system and the access point device. The mobile device and the access point device can perform an authentication or secure handshake to establish a secure connection upon receipt of notification of a failure. In implementations, the notification can be provided by the service provider system, the access point device, and/or combinations thereof. In implementations, the access point device can advertise the need for the secondary connection to the mobile device. In implementations, receipt of the notification can generate an alert to a user of the mobile device for permission to use the mobile device in the secondary connection. In this instance, the authentication or secure handshake process can take place upon user approval.

The method 11000 includes obtaining 11300 diagnostic information from the access point device. In implementations, the access point device can initiate gathering of diagnostic data in the event of a network connection failure. In implementations, the mobile device can instruct the access point device to gather the diagnostic data.

The method 11000 includes sending 11400 a configuration update to the access point device. The mobile device can review the diagnostic data received from the access point device and generate a configuration update in view of the diagnostic data.

The method 11000 includes receiving 11500 confirmation of the configuration update. The access point device can apply the configuration update and send results to the mobile device. In implementations, the mobile device can confirm application of the configuration update.

The method 11000 includes disconnecting 11600 the secure connection upon restoration of the network connection between the service provider system and the access point device.

Figure 12:
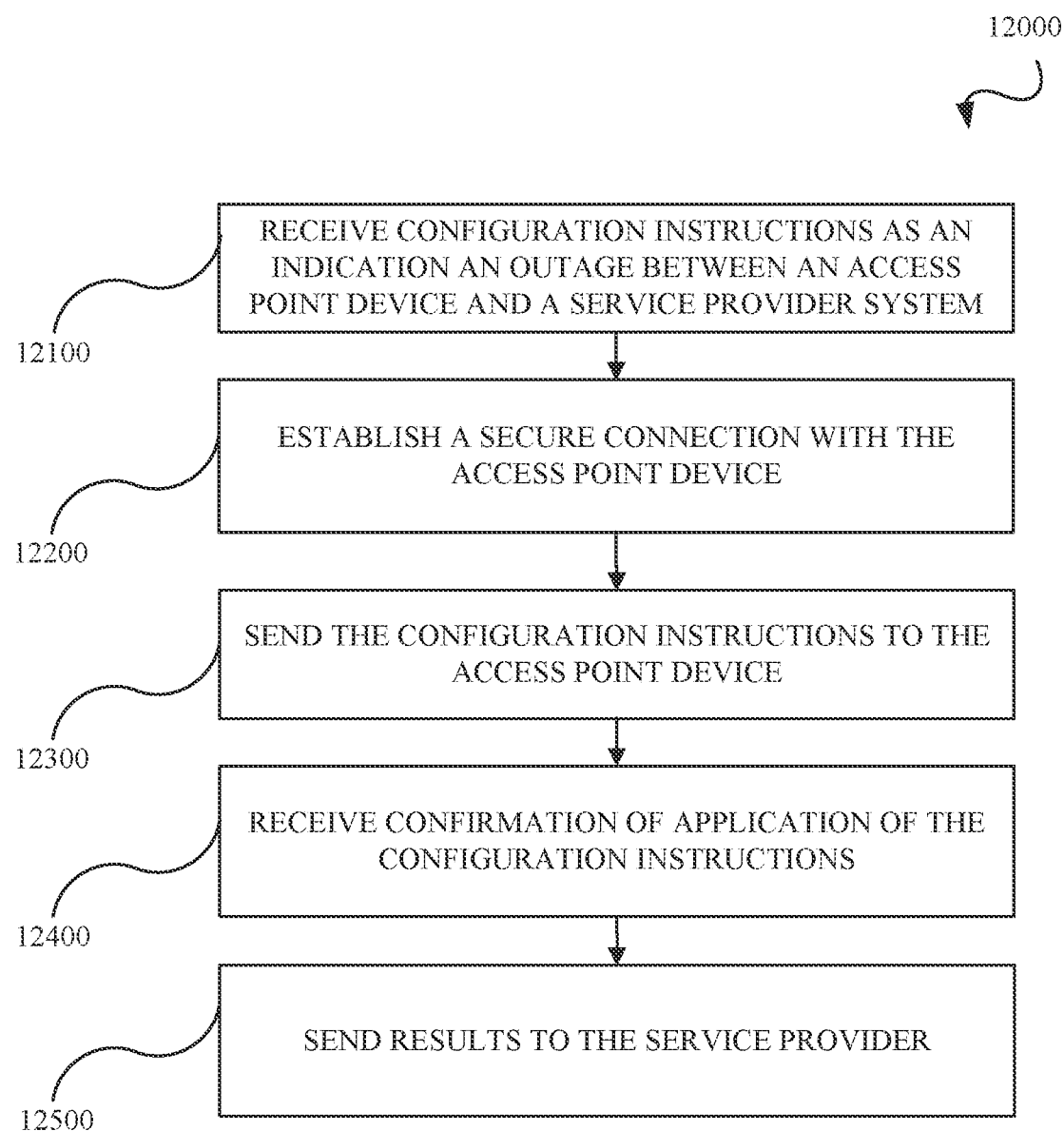
FIG. 12 is a flowchart of an example method for network device and local area network recovery and management using mobile devices in accordance with embodiments of this disclosure.

FIG. 12 is a flowchart of an example method 12000 for network device and local area network recovery and management using mobile devices in accordance with embodiments of this disclosure. The method 12000 includes: receiving 12100 configuration instructions as an indication an outage between an access point device and a service provider system; establishing 12200 a secure connection with the access point device; sending 12300 the configuration instructions to the access point device; receiving 12400 confirmation of application of the configuration instructions; and sending 12500 results to the service provider. For example, the technique 12000 may be implemented, as applicable and appropriate, by the service provider system 1100, the cable modem termination system 1110, the configuration management system 1120, the modem 1300, the router 1400, the router controller 1440, the redundant router controller 1450, the connected device 1500, the mobile device 1600, the wireless network 1700, the base stations 1710, 1720, and 1730, the device 2000, the processor 2100, the communication interface 2200, the memory/storage 2300, and the applications 2400.

The method 12000 includes receiving 12100 configuration instructions as an indication an outage between an access point device and a service provider system. In implementations, a service provider can provide services to a premises by providing and connecting an access point device to a service provider system via a network connection. Configuration and maintenance of the access point device can be performed over the network connection. A secondary connection for configuration and maintenance can be provided by enabling the access point device and a mobile device associated with the premises be connected in case the network connection fails. The mobile device can provide authentication credentials, such as public and private keys, to the access point device when the mobile device initially connects to the access point device. In implementations, this can be processed via the service provider system. The access point device can have one or more controllers to handle the network connection and the secondary connection. The mobile device can receive configuration instructions from the service provider system which indicate that an outage has occurred and instructions for repairing the outage, for applying a configuration change, for performing an access point device policy update, and/or combinations thereof.

The method 12000 includes establishing 12200 a secure connection with the access point device. The mobile device and the access point device can perform an authentication or secure handshake to establish a secure connection. In implementations, the access point device can advertise the need for the secondary connection to the mobile device. In implementations, receipt of the notification can generate an alert to a user of the mobile device for permission to use the mobile device in the secondary connection. In this instance, the authentication or secure handshake process can take place upon user approval.

The method 12000 includes sending 12300 the configuration instructions to the access point device. The mobile device can relay or forward the configuration instructions to the access point device.

The method 12000 includes receiving 12400 confirmation of application of the configuration instructions. The access point device can apply the configuration instructions and send results to the mobile device. In illustrative examples, the configuration instructions can be to disable a rogue device, update a policy, update router configuration based on received diagnostic logs, update LAN based rules, update network blocking rules, update firewall rules, device kicking rules, firmware updates, software updates, and the like and/or combinations thereof. In implementations, the mobile device can confirm application of the configuration instructions.

The method 12000 includes sending 12500 results to the service provider. The mobile device can send the results from the application of the configuration instructions to the service provider system. In implementations, the mobile device can disconnect the secondary connection upon sending the results.

Figure 13:
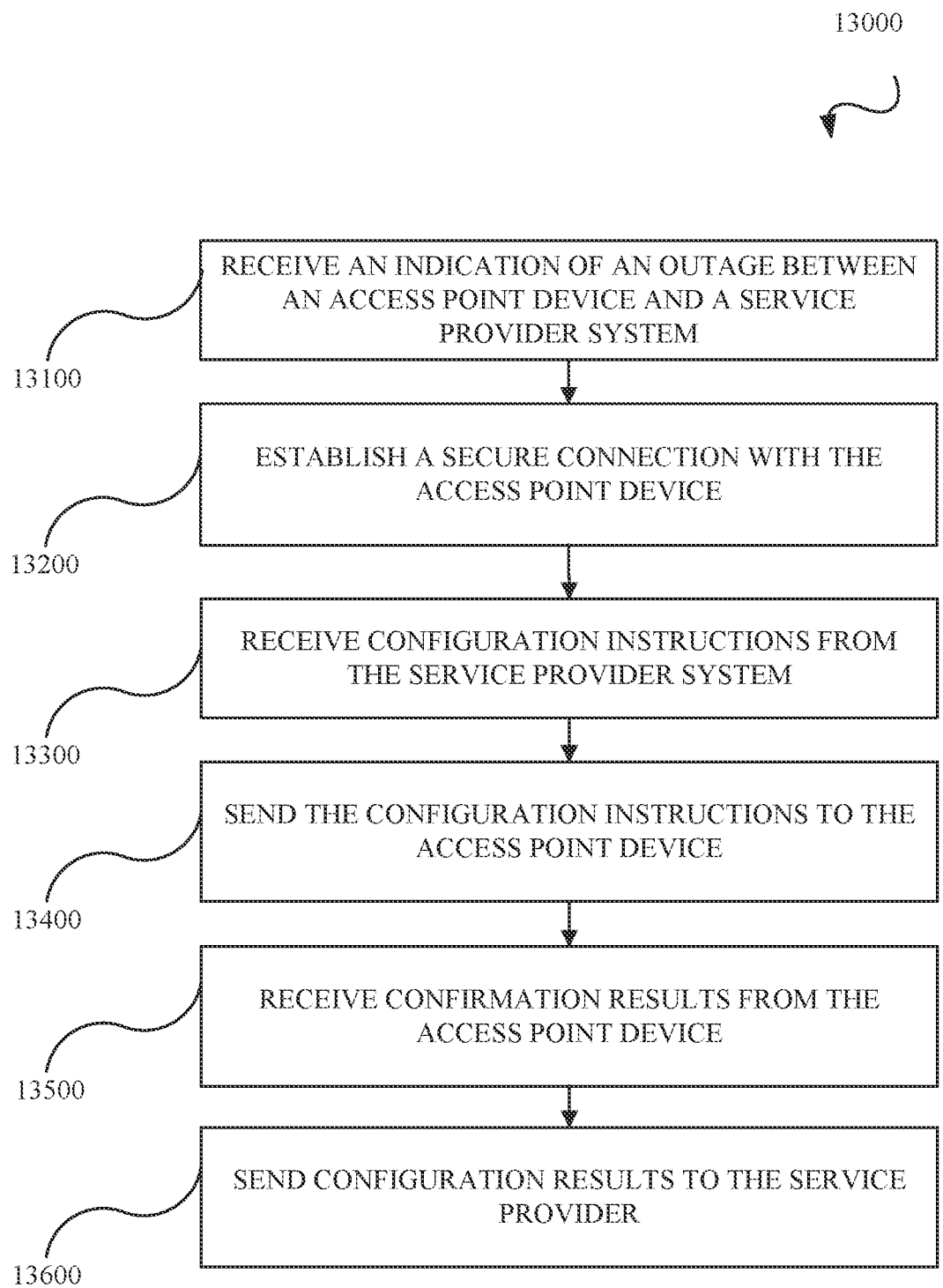
FIG. 13 is a flowchart of an example method for network device and local area network recovery and management using mobile devices in accordance with embodiments of this disclosure.

FIG. 13 is a flowchart of an example method 13000 for network device and local area network recovery and management using mobile devices in accordance with embodiments of this disclosure. The method 13000 includes: receiving 13100 an indication of an outage between an access point device and a service provider system; establishing 13200 a secure connection with the access point device; receiving 13300 configuration instructions from the service provider system; sending 13400 the configuration instructions to the access point device; receiving 13500 configuration results from the access point device; and sending 13600 the configuration results to the service provider. For example, the technique 13000 may be implemented, as applicable and appropriate, by the service provider system 1100, the cable modem termination system 1110, the configuration management system 1120, the modem 1300, the router 1400, the router controller 1440, the redundant router controller 1450, the connected device 1500, the mobile device 1600, the wireless network 1700, the base stations 1710, 1720, and 1730, the device 2000, the processor 2100, the communication interface 2200, the memory/storage 2300, and the applications 2400.

The method 13000 includes receiving 13100 an indication of an outage between an access point device and a service provider system. In implementations, a service provider can provide services to a premises by providing and connecting an access point device to a service provider system via a network connection. Configuration and maintenance of the access point device can be performed over the network connection. A secondary connection for configuration and maintenance can be provided by enabling the access point device and a mobile device associated with the premises be connected in case the network connection fails. The mobile device can provide authentication credentials, such as public and private keys, to the access point device when the mobile device initially connects to the access point device. In implementations, this can be processed via the service provider system. The access point device can have one or more controllers to handle the network connection and the secondary connection. The mobile device can receive an indication that an outage has occurred. In implementations, the indication can be provided by the service provider system, the access point device, and/or combinations thereof. In implementations, receipt of the indication can generate an alert to a user of the mobile device for permission to use the mobile device in the secondary connection.

The method 13000 includes establishing 13200 a secure connection with the access point device. The mobile device and the access point device can perform an authentication or secure handshake to establish a secure connection upon receipt of the indication. The mobile device can send confirmation to the service provider system upon establishment of the secure connection.

The method 13000 includes receiving 13300 configuration instructions from the service provider system. The mobile device can receive configuration instructions from the service provider system after confirming establishment of the secure connection.

The method 13000 includes sending 13400 the configuration instructions to the access point device. The mobile device can relay or forward the configuration instructions to the access point device.

The method 13000 includes receiving 13500 configuration results from the access point device. The access point device can apply the configuration instructions and send results to the mobile device. In illustrative examples, the configuration instructions can be to disable a rogue device, update a policy, update router configuration based on received diagnostic logs, update LAN based rules, update network blocking rules, firewall rules, device kicking rules, and the like and/or combinations thereof. In implementations, the mobile device can confirm application of the configuration instructions.

The method 13000 includes sending 13600 the configuration results to the service provider. The mobile device can send the configuration results from the application of the configuration instructions to the service provider system. In implementations, the mobile device can disconnect the secondary connection upon sending the configuration results.

In general, a method for access point device recovery and management using mobile devices, includes providing, by a mobile device to an access point device via a service provider system, authentication details of the mobile device, establishing a secure wireless connection using the authentication details between the access point device and the mobile device upon receiving, by the mobile device, an indication of failure of a network connection between the service provider system and the access point device, sending, by the mobile device to the access point device over the secure wireless connection, a configuration instruction, receiving, by the mobile device from the access point device over the secure wireless connection, confirmation of the configuration instruction, and disconnecting the secure connection upon successful application of the configuration instruction. In implementations, the method includes obtaining, by the mobile device from the access point device over the secure wireless connection, diagnostic information for the access point device, sending, by the mobile device to the service provider system, the diagnostic information, receiving, by the mobile device from the service provider system, the configuration instruction based on the diagnostic information, and restoring the network connection between the service provider system and the access point device. In implementations, the method includes obtaining, by the mobile device from the access point device over the secure wireless connection, diagnostic information, sending, by the mobile device to the access point device over the secure wireless connection, the configuration instruction based on the diagnostic information, and restoring the network connection between the service provider system and the access point device. In implementations, the indication is the configuration instruction. In implementations, the configuration instruction is at least one of a disable a rogue device, update a policy, update access point device configuration based on received diagnostic logs, update local area network based rules, update network blocking rules, update firewall rules, device kicking rules, firmware updates, or software updates. In implementations, the method further includes switching from a primary controller to a secondary controller in the access point device, wherein the primary controller handles access point device processes with respect to the network connection and the secondary controller handles access point device processes with respect to the secure wireless connection. In implementations, the secure wireless connection is one of a Wi-Fi® connection or a Bluetooth® connection.

In general, a method for router recovery and management using a wireless device includes providing a router with a router controller and a redundant router controller, wherein the router controller handles router management with respect to a wired connection between the router and an Internet service provider (ISP) and the redundant router controller handles router management with respect to a wireless connection, exchanging authentication credentials to establish the wireless connection between the router and the wireless device in the event of an outage of the wired connection, switching from the router controller to the redundant router controller, sending, by the mobile device to the to the redundant router controller, a management command, receiving, by the mobile device from the redundant router controller, results after application of the management command, and disconnecting the wireless connection for successful results. In implementations, the method further includes receiving, by the mobile device from the redundant router controller, failure data for the router, sending, by the mobile device to the ISP, the failure data, receiving, by the mobile device from the ISP, the management command based on the failure data, and restoring the wired connection between the ISP and the router. In implementations, the indication is the management command. In implementations, the management command is at least one of a disable a rogue device, update a policy, update access point device configuration based on received diagnostic logs, update local area network based rules, update network blocking rules, update firewall rules, device kicking rules, firmware updates, or software updates. In implementations, the method further includes providing, by a mobile device to the router via the ISP, the authentication credentials of the mobile device. In implementations, the method further includes receiving, by the mobile device from the redundant router controller, failure data for the router, sending, by the mobile device to the redundant router controller, the management command based on the failure data, and restoring the wired connection between the ISP and the router.

In general, a service provider network including a service provider system including a configuration management server and a router including a main controller a secondary controller; and at least one radio managed by the secondary controller, wherein the router is configured to communicate command and control information with the configuration management server using the main controller, receive, upon initial connection to the router, a public key from a mobile device, switch from the main controller to the secondary controller for communication outage between the main controller and the configuration management server, and communicate command and control information with the mobile device using the secondary controller and the at least one radio. In implementations, the router is further configured to notify the mobile device of the communication outage between the main controller and the configuration management server. In implementations, the router is further configured to establish an authenticated connection by handshaking with the mobile device using the public key and a private key stored by the mobile device. In implementations, the router further is configured to apply commands received from the mobile device, switch from the secondary controller to the main controller upon restoration of the communication between the main controller and the configuration management server, and disconnect communication of the command and control information with the mobile device using the secondary controller and the at least one radio. In implementations, the commands are at least one of a disable a rogue device, update a policy, update access point device configuration based on received diagnostic logs, update local area network based rules, update network blocking rules, update firewall rules, device kicking rules, firmware updates, or software updates. In implementations, the secondary controller and the main controller are an integrated controller. In implementations, the command and control information received from the mobile device are relayed by the mobile device from the configuration management server.

Although some embodiments herein refer to methods, it will be appreciated by one skilled in the art that they may also be embodied as a system or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects are described herein with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for access point device recovery and management using mobile devices, the method comprising:
    establishing, between an access point device and a mobile device by the mobile device, a secure wireless connection using authentication details provided by the mobile device in an event the mobile device receives from a service provider system an indication of a network connection failure between the service provider system and the access point device, wherein the access point device is a router;
    sending, by the mobile device to the access point device over the secure wireless connection, a configuration instruction based on diagnostic information received from the access point device, wherein the network connection between the service provider system and the access point device is restored based on the configuration instruction;
    receiving, by the mobile device from the access point device over the secure wireless connection, confirmation of receipt of the configuration instruction; and
    disconnecting the secure wireless connection upon successful application of the configuration instruction,
    wherein the access point device switches from a network connection controller configured to handle communications with the service provider system to a secure wireless connection controller configured to handle communications with the mobile device in the event of the network connection failure.

2. The method of claim 1, wherein the authentication details of the mobile device are provided to the access point device via a service provider system.

3. The method of claim 1, wherein the network connection controller is a primary controller and the secure wireless connection controller is a secondary controller.

4. The method of claim 1, the method further comprising:
    obtaining, by the mobile device from the access point device over the secure wireless connection, the diagnostic information for the access point device;
    sending, by the mobile device to the service provider system, the diagnostic information; and
    receiving, by the mobile device from the service provider system, the configuration instruction based on the diagnostic information.

5. The method of claim 1, wherein the indication is the configuration instruction.

6. The method of claim 1, wherein the configuration instruction is at least one of a disable a rogue device, update a policy, update access point device configuration based on received diagnostic logs, update local area network based rules, update network blocking rules, update firewall rules, device kicking rules, firmware updates, or software updates.

7. The method of claim 1, wherein the secure wireless connection is one of a Wi-Fi® connection or a Bluetooth® connection.

8. A router comprising:
a network connection controller configured to handle communications with a service provider system using a network connection;
a secure wireless connection controller configured to configured to handle communications with a mobile device in the event of a network connection failure, wherein the router switches from the network connection controller to the secure wireless connection controller in the event of the network connection failure, the secure wireless connection controller configured to:
establish a secure wireless connection with a mobile device using authentication details provided by the mobile device in an event the mobile device receives from the service provider system an indication of a network connection failure between the service provider system and the router;
receive from the mobile device over the secure wireless connection a configuration instruction based on diagnostic information received from the router, wherein the network connection between the service provider system and the router is restored based on the configuration instruction;
receive from the mobile device over the secure wireless connection confirmation of receipt of the configuration instruction; and
disconnect the secure wireless connection upon successful application of the configuration instruction.

9. The router of claim 8, wherein the authentication details of the mobile device are provided to the router via a service provider system.

10. The router of claim 8, wherein the network connection controller is a primary controller and the secure wireless connection controller is a secondary controller.

11. The router of claim 8, the secure wireless connection controller further configured to:
send to the mobile device over the secure wireless connection the diagnostic information for the router.

12. The router of claim 8, wherein the indication is the configuration instruction.

13. The router of claim 8, wherein the configuration instruction is at least one of a disable a rogue device, update a policy, update access point device configuration based on received diagnostic logs, update local area network based rules, update network blocking rules, update firewall rules, device kicking rules, firmware updates, or software updates.

14. The router of claim 8, wherein the secure wireless connection is one of a Wi-Fi® connection or a Bluetooth® connection.

15. A service provider network comprising:
a configuration management server;
a router including a network connection controller configured to handle communications with the configuration management server, a secure wireless connection controller configured to handle communications with a mobile device in the event of a network connection failure, and at least one radio managed by the secure wireless connection controller, wherein the router is configured to:
establish with the mobile device a secure wireless connection using authentication details provided by the mobile device in an event the mobile device receives from the service provider network an indication of a network connection failure between the configuration management server and the router;
receive from the mobile device over the secure wireless connection a configuration instruction based on diagnostic information received from the router, wherein the network connection between the configuration management server and the router is restored based on the configuration instruction;
send to the mobile device over the secure wireless connection confirmation of receipt of the configuration instruction; and
disconnect the secure wireless connection upon successful application of the configuration instruction,
wherein the router switches from the network connection controller configured to handle communications with the configuration management server to the secure wireless connection controller configured to handle communications with the mobile device in the event of the network connection failure.

16. The router of claim 15, wherein the authentication details of the mobile device are provided to the router via the service provider network.

17. The router of claim 15, wherein the network connection controller is a primary controller and the secure wireless connection controller is a secondary controller.

18. The router of claim 15, the secure wireless connection controller further configured to:
send to the mobile device over the secure wireless connection the diagnostic information for the router.

19. The router of claim 15, wherein the indication is the configuration instruction.

20. The router of claim 15, wherein the configuration instruction is at least one of a disable a rogue device, update a policy, update access point device configuration based on received diagnostic logs, update local area network based rules, update network blocking rules, update firewall rules, device kicking rules, firmware updates, or software updates.

* * * * *